April 28, 1964 G. D. SHELTON V 3,130,913
FIBER CUTTER AND ASPIRATOR
Filed Dec. 9, 1960 5 Sheets-Sheet 1
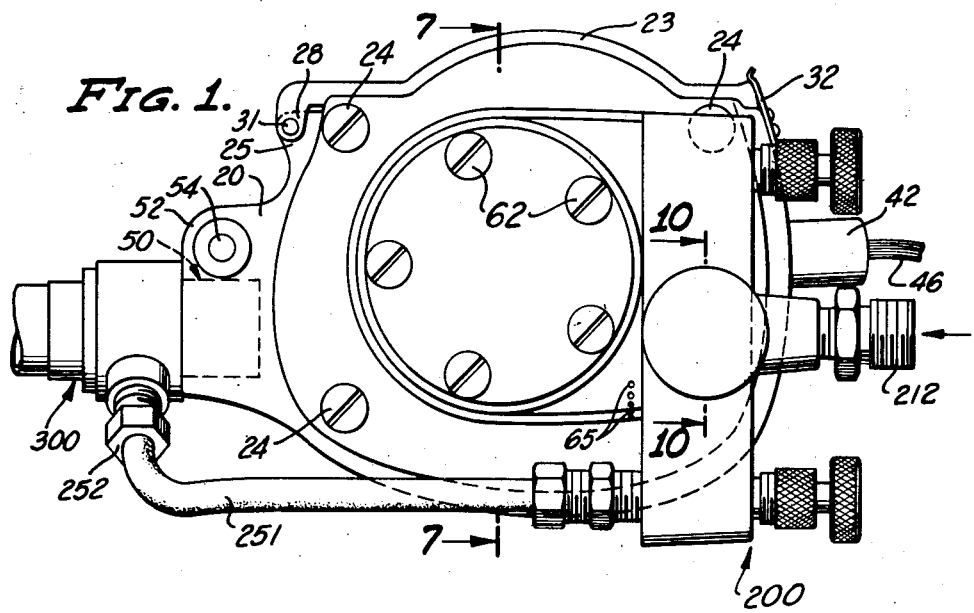
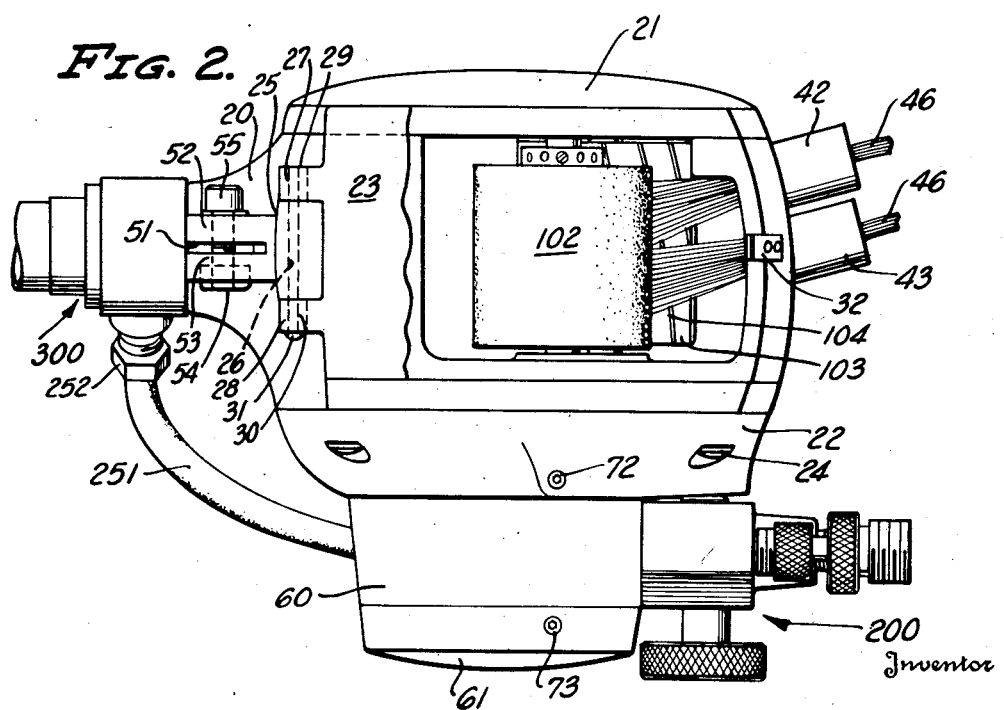
Inventor
GEORGE D. SHELTON V
By
Attorney

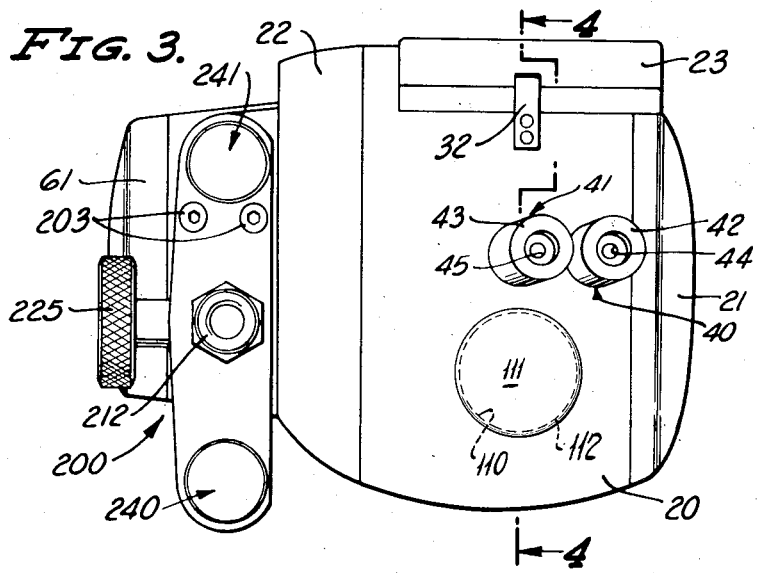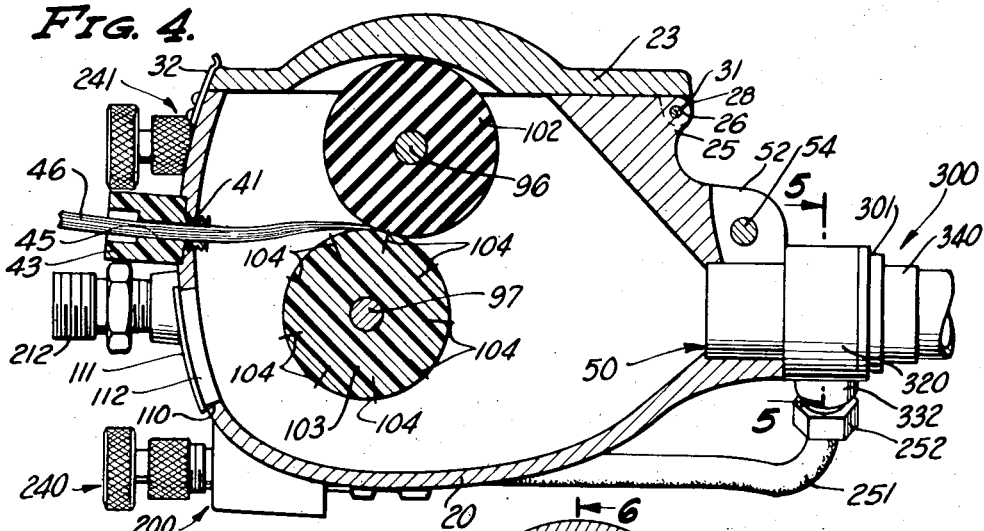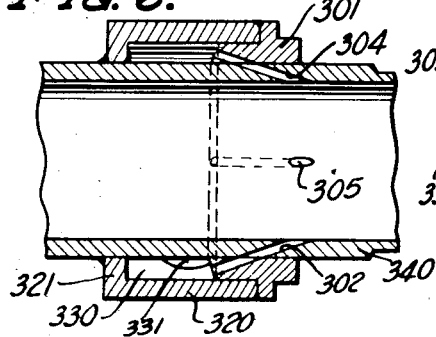

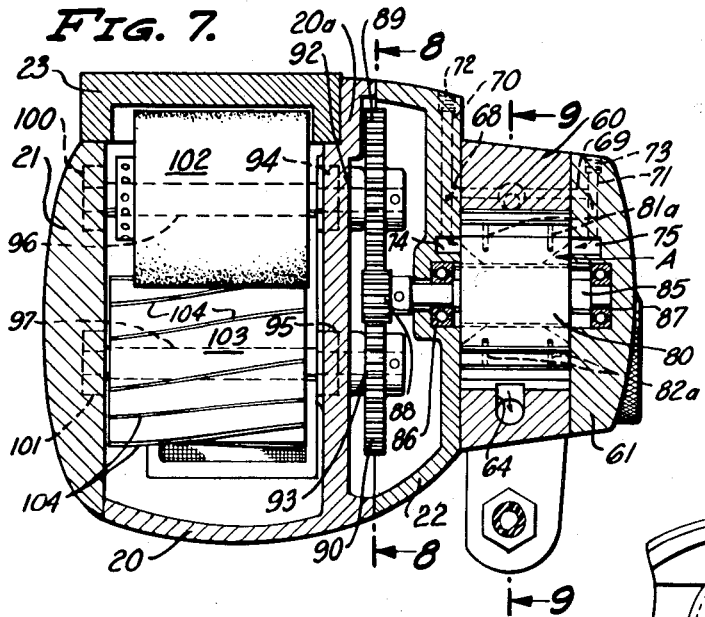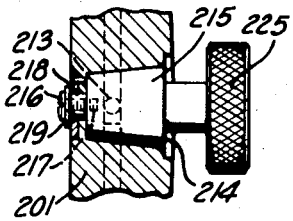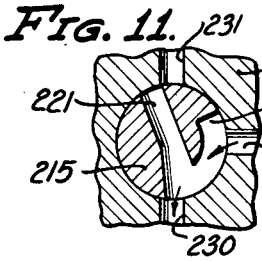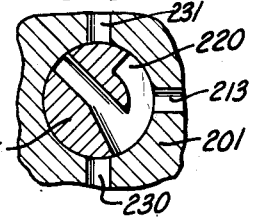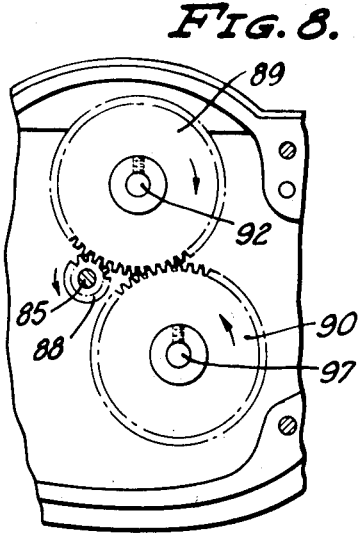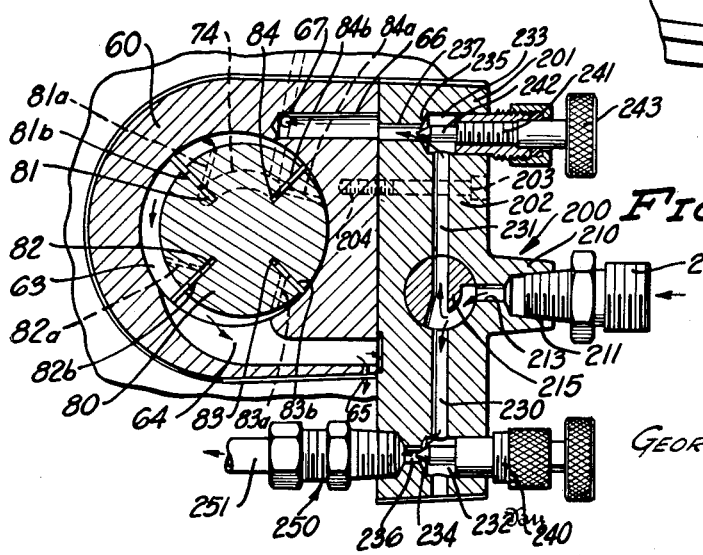

April 28, 1964     G. D. SHELTON V     3,130,913
FIBER CUTTER AND ASPIRATOR
Filed Dec. 9, 1960     5 Sheets-Sheet 4

Inventor
GEORGE D. SHELTON V

By

Attorney

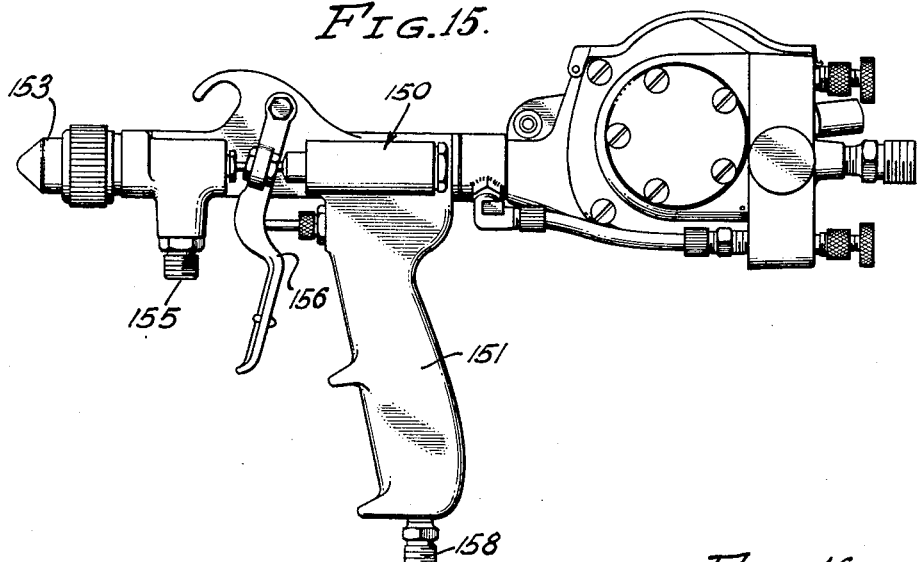
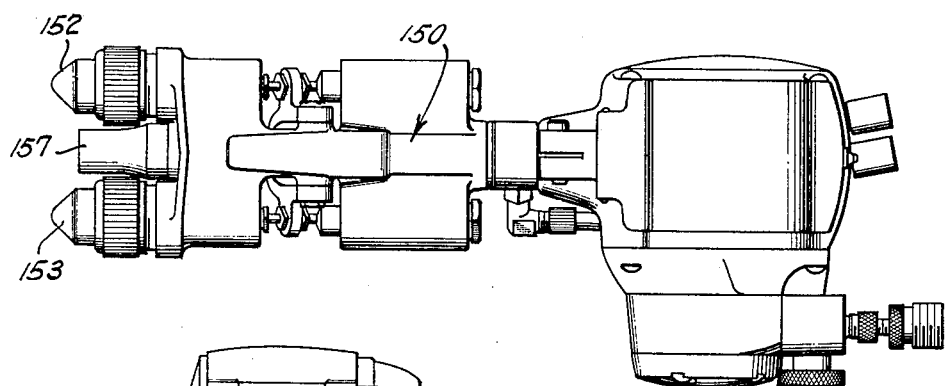
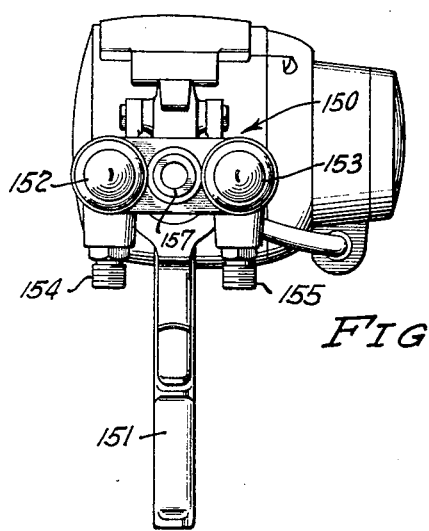

United States Patent Office 3,130,913
Patented Apr. 28, 1964

3,130,913
FIBER CUTTER AND ASPIRATOR
George D. Shelton V, Riverside, Calif., assignor, by mesne assignments, to The Flintkote Company, New York, N.Y., a corporation of Massachusetts
Filed Dec. 9, 1960, Ser. No. 74,935
2 Claims. (Cl. 239—415)

This invention relates generally to cutters for fibers and more particularly to an improved portable cutter for glass roving and other fibers.

There are many products, and recently most importantly, fiberglass, which are produced in continuous lengths known as roving. This roving comprises many threads of such products. The particular device concerned in this application was developed for use with all fiber materials including fiberglass. The references hereinafter made will be directed to all such materials, but reference will be particularly made to fiberglass roving; although such references will be particularly directed to fiberglass, and, although this is a major use for which the device was developed, this is not to be deemed a limitation, but it is to be understood that where the term "fiberglass," or "fiberglass roving" is used that other materials such as nylon, cotton, hemp and the like, could be used as well.

There are many applications of fiberglass particularly in combination with resins and other binders in which it is desirable to have a fiberglass mat, which is a pad, or layer, of short lengths of fiberglass in a random pattern to form a cloth-like sheet of the material. This material, when in a mat form or chopped form, is more bulky and more difficult of transport and handling than the roving. Such mat or chopped material is also much more costly and the ultimate aim of the use of such mat form is generally to incorporate it into a finished product in which the fiber is impregnated with a resin or other liquid material. In such use, it is particularly desirable to envelope each strand of glass with resin or other liquid material being used. In order to accomplish this, of course, it is necessary that the material be cut and if possible joined with the resin or other material prior to being laid into a mat. For this reason, it has long been deemed desirable to cut roving rapidly into the particular length desired for use and application at the immediate point of final use or fabrication of the chopped fibers or the mat.

Certain cutters have been developed for this purpose which cut quantities of glass fibers and which cutters are relatively portable. When such devices as have been previously developed are used, they cut or chop a large quantity of glass fiber and either wildly spew the material out into the air or drop it in one relatively confined space. The results of either operation lack some of the desired finished characteristics. When the glass is spewed out into the air, a great deal of it is lost or scattered about the area in unusable condition. When it is dropped down in a mass, it is necessary to use a roller or the like to compact, and properly distribute, and impregnate the resin into the material.

It has been deemed desirable to develop a mechanism for cutting glass roving and simultaneously directing it in a forceful manner against a surface and with an accuracy of location and direction such that a usable mat is formed over whatever area may be desired without further work or processing or rolling.

It has further been deemed desirable to perfect such a mechanism which can be used in conjunction with sprayguns, such as the Sealzit gun as shown in U.S. Patent 2,813,751, for spraying polyester resins or other binders in conjunction with the cut fiberglass so that in operation the finished fiberglass mat with the binding material is laid in place where desired, and fully impregnated with resin.

There have been certain developments to attempt to produce such a result but these have been unsuccessful due to the lack of proper directioning and proper placement of the fiberglass as well as due to a lack of proper cutting and uniform distribution ability of such devices. The result of the same has been to combine a mass of chopped fiberglass with resin or other binder but which requires rolling or other compaction and distribution of the material.

It has also been deemed desirable to provide a fully enclosed cutter for glass fibers and the like having a source of filtered air to be used in directing the course of the material being cut and to aspirate it from the cutter and direct it into the pattern desired for final use. Other cutters have been unable to achieve this result because of the placement of their guide rollers and the like and because of a lack of a proper aspirating device.

I have developed a small compact cutter which utilizes the principle of slicing the fiberglass through an angular relationship of the cutting blades and which, through a unique aspirating venturi-like placement tube, and through specially designed valves which constantly clear the cutting chamber has accomplished the desired results and in addition is adaptable to combined use with proper sprayguns and in particular with a spraygun such as is described herein, and such as is described in U.S. Patent No. 2,813,751.

It is an important object of my invention to provide a portable, economical cutter for fiberglass and other fiber.

It is a still further object of my invention to provide a portable, economical cutter for fiberglass and other fibers which controls the direction of expulsion of the cut fibers.

It is still a further object of my invention to provide a cutter as described which utilizes the slicing principle of cutting the fiberglass.

It is still a further object of my invention to provide a cutter as described which has a fully enclosed cutting chamber with proper air supply to keep the same cleared of cut fibers.

It is still a further object of my invention to provide a cutter described which can be used in conjunction with a spraygun for laying down a fiberglass mat with resin, in which the fiberglass before being blown into a mat has become thoroughly impregnated in the air with the resin.

It is still a further object of my invention to provide an asperating tube suitable to withdraw cut fibers and other materials and expel them in a usable pattern and form, either independently or in conjunction with other materials sprayed into the air.

It is still a further object of my invention to provide a valving mechanism in which the cutting of fibers can be properly controlled along with the expulsion by the said aspirating tube.

The foregoing and other objects and advantages of this invention will be apparent to those skilled in the art upon reading the following specifications in conjunction with the attached drawings in which:

FIGURE 1 is a left side elevation;
FIGURE 2 is a plan with the cover broken away;
FIGURE 3 is a rear elevation;
FIGURE 4 is a section through 4—4 of FIGURE 3;
FIGURE 5 is an enlarged section through 5—5 of FIGURE 4;
FIGURE 6 is an enlarged section through 6—6 of FIGURE 5;
FIGURE 7 is a section through 7—7 of FIGURE 1;
FIGURE 8 is a fragmentary section on 8—8 of FIGURE 7;

FIGURE 9 is section through 9—9 of FIGURE 7 with the valve open;

FIGURE 10 is a fragmentary section on 10—10 of FIGURE 1;

FIGURE 11 is an enlarged fragmentary section of the same valve shown in FIGURE 9, partly opened;

FIGURE 12 is an enlarged fragmentary view of the same valve shown in FIGURE 9, closed;

FIGURE 15 is a side view of the device of FIGURE 1 mounted on a gun;

FIGURE 16 is a top view of the device of FIGURE 15; and

FIGURE 17 is a front view of the device of FIGURE 15.

Figure 13:
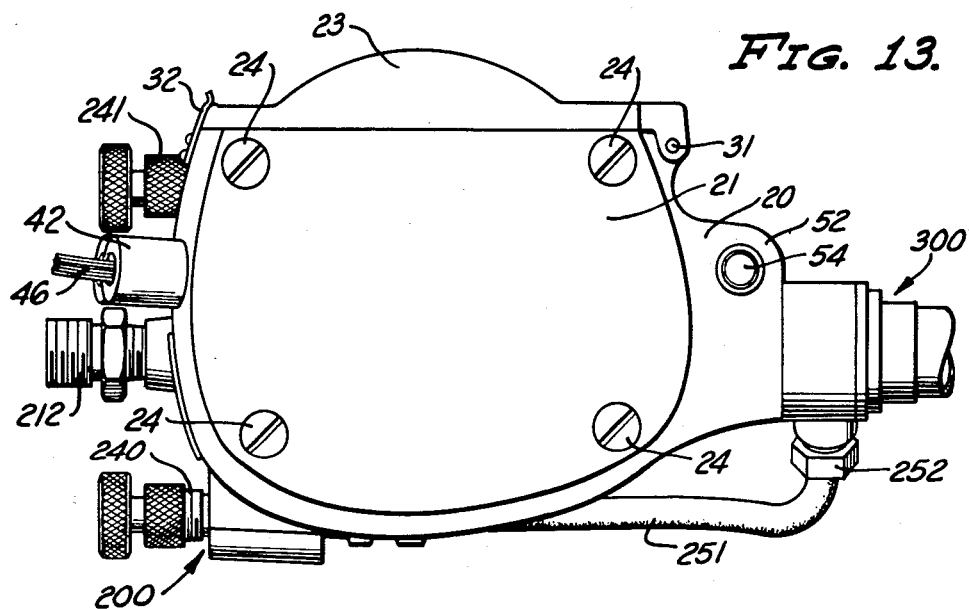
FIGURE 13 is a right side elevation.
Figure 14:
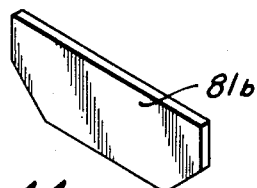
FIGURE 14 is an enlarged perspective of an air motor vane.

The cutting mechanism is enclosed in a housing consisting of a main body 20 having a removable side plate 21 and a second removable side plate 22. Each of the side plates is fastened to the main body 20 with suitable metal screws or studs 24 through holes in the said cover plates and entering into and fastened into tapped holes in the said main body portion 20. In the drawings, there are revealed only a few of the said studs 24, it being understood that any number which might conveniently hold the plates in place could be used. In a model presently in production I use four on each side. The main body casting 20 is provided with a lug 25, with a drilled hole 26. A top cover plate 23 is provided with two forwardly depending lugs 27 and 28 with drilled holes respectively 29 and 30 so shaped and placed as to align with the said hole 26 through the lug 25. A pin 31 extends through all of said holes and acts as a hinge for said top cover 23. A spring clip 32 is riveted or otherwise fastened to the main body section 20 to hold the top cover 23 closed while the cutter is in operation. As necessary to replace cutting rotors or to perform other operations inside the cutter as will be described later in this application, the hinged cover 23 may be lifted to provide ready access to the interior of the said cutter formed by the main housing 20 and the sides 21 and 22. The main housing 20 is provided with two holes 40 and 41 having guide nipples 42 and 43 respectively fastened by threads or the like into said holes. Each of said guide nipples is composed of any suitable material preferably a material such as Teflon or the like. The nipples 42 and 43 will be seen to each have a hole 44 and 45 respectively running through its length suitable to accommodate a strand of fiberglass or the like 46.

The housing 20 is provided with an exhaust passage 50 which exhaust passage intercommunicates with a slot 51 through an enlarged portion 52 of the main body 20. A hole 53 is drilled through both sides of said enlarged portion 52 and a bolt 54 is fastened by means of a nut 55 through the two sides of said enlarged portion 52. When the bolt 54 is tightened, the two sides of the enlarged portion 52 converge together in the slotted area 53 thus reducing the diameter of the exhaust aperture 50. In this way, the exhaust aperture 50 is closed tightly upon the grips exhaust aspirating tube assembly 300 which will be described in greater detail below.

The cover plate 22 has a cylindrical chamber 60 attached to and protruding outwardly from it. Said chamber 60 has an outer cover plate 61 fastened by suitable screws 62 which go through holes in said outer cover plate 61 and through holes (not shown) in said protrusion 60 into tapped holes (not shown) in said cover plate 22. Alternately said protrusion 60 may be fastened to said cover plate 22 by separate screws to the inner side of said cover plate 22 into tapped holes in said protrusion 60 and said outer cover plate fastened to said protrusion 60 by screws through it into tapped holes in said protrusion 60.

Said protrusion 60 has a cylindrical hole 63 running through its thickness, said cylindrical hole 63 intercommunicates with an air passage 64 which in turn has an escape vent 65 to allow air to pass completely out of said protrusion 60 and through said chambers and air escape passages.

Said protrusion is also provided with an air hole 66 extending part way into said protrusion but not interconnecting with said chamber 63. Said hole 66 intercommunicates with a longitudinal hole 67 which in turn intercommunicates with holes 68 and 69 in cover plate 22 and 62 respectively. Hole 68 intercommunicates with hole 70 in cover plate 22 and hole 69 intercommunicates with hole 71 in cover plate 67. Hole 70 has a suitable plug 72 to prevent air escaping outwardly and hole 71 has a suitable plug 73 for the same purpose.

Hole 70 intercommunicates with an arcuate chamber 74 and hole 71 intercommunicates with a like arcuate chamber 75, each of which chambers 74 and 75 in turn intercommunicate as shown with air chamber 63 when the entire mechanism is assembled as seen in FIGURE 7 and the other drawings.

A rotor 80 is mounted in said chamber 63 as shown. Said rotor 80 has a diameter less than chamber 63 and is mounted so that its outer surface coincides with the inner surface of said chamber 63 at the rear. Said rotor 80 is provided with a series of longitudinal slots 81, 82, 83 and 84, which slots intercommunicate during a portion of the travel with said arcuate chambers 74 and 75.

Each of the slots 81, 82, 83 and 84 has two air holes 81a, 82a, 83a and 84a respectively interconnecting at a point below the surface of said rotor and running at an angle as indicated on the drawing.

Each of the slots 81, 82, 83 and 84 has a vane 81b, 82b, 83b and 84b respectively to close tolerance within said slots so as to avoid passage of air through the same. The vanes are all identical in size and shape, being rectangular, with beveled lower edges so that air from chambers 74 and 75 always presses inwardly and upwardly on said beveled edges of said vanes as shown at A on FIGURE 7.

The arcuate chambers 74 and 75 are of sufficient length that as one of the slots 81, 82, 83 and 84 is leaving the are of contact with said chamber another of said slots has entered the area of contact, so that at least one slot is always in communication with said chambers 74 and 75.

The vanes 81b, 82b, 83b and 84b are so designed with said beveled lower edges and the said slots in which they travel are so designed that they never completely fill said slots and even when completely enclosed in said slots there is a suitable passage at the lower extremity thereof to receive air from said arcuate chambers 74 and 75. Thus when in contact with such chambers, the air pressure upward from the bottom of said vanes forces them outward in their respective slots and against the inner surface of the chamber 63.

The air from said arcuate chambers also passes in through said slots and through the holes 81a, 82a, 83a and 84a giving a jet like action which causes the rotor 80 to turn.

This particular structure makes an exceedingly effective air motor for the type of operation which will be hereafter described and which is necessary in the use of this particular cutter; however, in lieu of the particular mechanism particularly described, any air or electric motor could be used to provide the motive power at this point, although, as hereinafter described, the particular valve construction as used in this item is of particular value in conjunction with an air motor of the type described.

It will be clear to those skilled in the art that any number of motors could be attached in any variety of means and methods to the basic cutter housing structure involved in this application and either with or without the use of a valve such as the special valving arrangement which will be hereinafter described could be used to provide the motive power for the cutting mechanism involved in this application. It is not desired to limit this application to the particular type air motor shown, since a wide variety of motors could be utilized, but it is desired to point out that this is a particularly efficient method of providing the motive power necesary in conjunction with this cutter. It is felt that the motor as particularly described and shown particularly together with the special valving arrangement and aspirating device is in itself inventive and a sub-combination.

The rotor 80 has a shaft 85 held in bearings 86 and 87 respectively in covers 22 and 62. The shaft 85 extends through bearing 86 and has a gear 88 fastened to its extended end. It will be observed that the plate 22 has a sufficient hole through its thickness as indicated to accommodate said shaft and a sufficient recessed chamber to accommodate said bearing 85. Gear 88 is enmeshed with gear 89 which in turn is enmeshed with matching gear 90. Thus gears 89 and 90 are driven at identical speeds and in opposite directions.

It will be seen that the main body portion 20 has an inner wall 20a which has two holes 92 and 93 respectively through its thickness. A pair of conventional bearings 94 and 95 are provided in recessed chambers in said inner wall 20a. The gear 89 is fastened to shaft 96 and the gear 90 is fastened to shaft 97. Each of said shafts is supported respectively by bearings 98 and 99. Cover plate 21 has two recessed portions with bearings 100 and 101 respectively to receive the ends of shafts 96 and 97.

Shaft 96 has fixedly mounted upon it a rotor or roller of rubber or the like 102 and shaft 97 has fixedly mounted upon it a roller or rotor 103 of Teflon or plastic or other type material having a series of sharp blades embedded 104 therein. In connection with rotor 102, I have observed that if Teflon (Du Pont trade name) or the like is used that there is a natural stropping action of the blades in conjunction with such material and maintains said blades sharp for a longer period of time than is otherwise possible.

Said blades 104 are set across the surface of said rotor 103 at an angular relation to the axis of said rotor as shown. In particular, I have observed that occasionally there will be back-lash of the rotor 102 if said blades are not set at a sufficient angular relationship across rotor 103. The maximum effectiveness and complete elimination of back-lash in rotor 102 results if the blades 104 are set at such an angle that the left end of one blade is on a plane horizontally across the face of said rotor 103 parallel to said shaft 97 with the next adjoining opposite end of the next blade. Thus the rotor 102 at all times is in engagement with at least a portion of one of the blades 104. When the left end of the rotor 102 is leaving engagement with one blade, the right end should be making engagement with the other end. The blades thus hold said rotor 102 from back-lashing or any tendency to back-lash. In addition, a particular gearing arrangement I have provided also eliminates the back-lashing situation by having a firm drive to both rotors. With the angular relationship of the blades as heretofore described, however, it is even possible to eliminate the driving gear 89 from the roller 102 and thus reduce the cost and mechanism involved. When this is the case, the driving gear 88 is shifted in position so that it is engaged in engagement with gear 90 rather than gear 89. The said rotors 102 and 103 are of equal diameter and of sufficient diameter so that they are in contact with one another. Glass fiber 46 in feeding between said rollers when they are turning is sliced by the angular relation of the blades which cuts or slices a portion of the fiber by coming in contact with it against the surface of the rotor 102 at varying times because of the angular relationship as shown. As clearly expressed above, this angular relationship also avoids rocking or bouncing back of the glass between the two rotors and the blades.

The two rotors being driven by the air motor pull the fiber 96 through the nipple 43 or 44 and through the slicing action, the fiber is cut into short lengths and discharged from the rotors and cutting blades on the opposite sides of rotors from which the said fiber strands enter the same.

The housing 20 has been provided with a hole 110 which is covered by press fit or by clips not shown of a fine mesh screen 111 and fiberglass or other suitable filtering medium 112. This has been so provided in order to admit clean air into the fully enclosed cutting chamber to provide sufficient source of air for the aspirating action which will be hereinafter described.

A special valve arrangement is provided in the mechanism indicated generally by the numeral 200. This mechanism consists of a block 201 having a plurality of holes 202, drilled through it suitable to accommodate bolts or studs 203 which are screwed into tapped holes 204 in protrusion 60.

The block 201 is provided with an air intake nipple 210 having a threaded hole 211 suitable to accommodate an air fitting 212. Hole 211 tapers into a small passage 213 which intercommunicates with a tapered hole 214. Tapered hole 214 has a cone 215 which is held tightly in place by screw 216 which is threaded into a tapped hole 217 in the cone 215 and which passes through hole 218 in block 201 and is supported against the walls thereof by washer 219. The cone 215 has an arcuate slot 220 extending approximately ⅓ its circumference as shown and intercommunicates with hole 221 which tapers as shown particularly in FIGURES 11 and 12. Cone 215 has a knurled handle 225 attached to it, which is used to turn it.

The arcuate slot 220 and the intercommunicating hole 221 in said cone 215 are so designed as indicated clearly in FIGURES 9, 11 and 12 that by turning the same air intake hole 213 is caused to intercommunicate with outlet holes 230 and 231, both at the same time as indicated in FIGURE 9 or with only hole 230 as indicated in FIGURE 11 or with neither of said holes as indicated in FIGURE 12. Holes 230 and 231 each have a communicatiton with an air chamber 232 and 233 respectively. Each of said air chambers has a tapered end 234 and 235 respectively intercommunicating with air passages 236 and 237 respectively. Needle valve mechanism 240 and 241 respectively are mounted in said chambers 232 and 233, said needle valves are of customary construction and are adapted to cause a complete closure of each of the passages 236 and 237 respectively as desired. Needle 242 is fed forward or backward by turning handle 243 which is threaded as shown so as to cause said needle valve to allow varying amounts of air to pass through passage 237. Valve 240 is also adjusted in a similar manner. Each needle valve when released will allow varying amounts of air to pass up to full capacity of each of said chambers 236 and 237 respectively. It will be observed that passage 237 intercommunicates with air hole 66 heretofore described and provides the air for power for the air motor described. Passage 236 intercommunicates with an air fitting 250 of normal structure which in turn passes air through tube 251 into another air fitting 252 of customary construction, which is welded or otherwise fastened to a cylindrical section 320. Said cylinder 320 is a part of special discharge tube and aspirating mechanism as will hereinafter be described.

Tube 340 is held in the exhaust passage 50 of the main body 20 as hereinbefore described. A cylindrical collar 301 is welded or otherwise fastened about said tube 340 as shown. A series of slanting holes 302, 303, 304, and 305 are drilled through the wall of said tube 340 and said collar 301. Cylinder 320 has a flange 321 on one end which is welded or otherwise fastened to tube 300. At its open end cylinder 320 is solidly welded or otherwise fastened to collar 301 resulting in an air chamber 330 surrounding the said tube 300. The air chamber 330 has a hole 331 which in turn has an inside threaded nipple 332 into which fits air fitting 252 providing source of air to said chamber 330.

The air passing through the holes 302, 303, 304 and 305 aspirates through tube 340 drawing the cut fibers as they leave the rotors 102 and 103 and forcibly ejects them forward and out of the tube 340. Filter 112 allows passage of clean air into the rotor chamber so that the said fibers can be sucked and drawn through in the passage of this air thus keeping the rotor chamber clear at all times.

The special aspirating device formed as it is and as it has been described has many uses other than as particularly pointed out in connection with the fibers. It is a characteristic of this device that the air stream is rushing at a much greater velocity in the center of the tube 340 than along the inner walls of the tube. It appears that the meeting position in the center of the tube where the multiple numbers of jets come together creates a special turbulence which results in this phenomenon. Because of this situation it is also possible to use this aspirating tube separate and apart from the cutting device and for this reason I believe it is a special inventive subcombination. It is possible for me to pass gravel and other abrasive or nonabrasive materials through this tube and because of the behaviour of the air patterns as heretofore mentioned there is virtually no wear on said tube, even when gravel or the like is passed through it. It appears that the turbulence of the air as resulting from these jet streams literally floats the particles through the center of the tube without touching the interior sides of the tube. I thus have used this particular tube in combination with sprayguns such as the spraygun described below with extremely excellent results and thus believe that my aspirating tube may be used in many wide varieties of applications for transport of various materials other than merely cut fibers as it is used in conjunction with the cutter herein described.

The special action of the valve mechanism 200 allows a setting of air for the air motor which will provide the desired speed for the motor and allows a setting of the valve for the aspirating device which will provide for the correct force aspirating stream of air. By setting these two valves at different points larger and smaller quantities of fiber can be cut depending upon the desired operation and they can be expelled with larger or greater force depending upon the particular use and result desired.

After the settings have been made as desired or at any time the entire operation may then be controlled by the use of the special central valve. By turning the cone 215 to the left the valve is completely closed and no air passes either to the motor or the aspirating tube. Upon turning to the right, the aspirating tube passage is opened first and receives air; after further turning the motor passage receives air and the cutter begins to work. By this arrangement, the aspirator is already working before the first fibers are cut and therefore the chamber is constantly kept clear as no fibers are allowed to cut and pile up in the chamber before the aspirations begin. Likewise when an operation is stopped the motor is turned off first thus allowing the final moment of aspiration during which the last fibers in the chamber are cleared before the aspirating supply is cut off.

In operation, glass or other fibers or other materials are fed into the rotor chamber and between the rotors as shown clearly in FIGURE 4. The valve is then opened and the rotors begin to revolve with the resultant cutting or slicing of the glass fibers into small pieces, and the aspiration of the same and the expelling of them forward through tube opening 300 by the aspirating device.

It is my belief that in addition to the overall device as presented that there are certain inventive sub-combinations disclosed herein, to wit:

(1) The special valve mechanism 200; this valve mechanism may be utilized either in conjunction with the apparatus as particularly described in the within application or with any one or more portions of the same. This valve mechanism standing by itself provides a valve by which two independent sources of air may be independently regulated and then may be controlled by a single valve which always activates one before the other and deactivates the last before the first. As described, the valve mechanism indicated in this application may be severed from the entire structure as shown and may be connected to any two sources of air and any two outlets for air and provide the unusual result indicated.

(2) The aspirating device 300: The aspirating device is deemed to be of particularly great value and may be used independently as a means to conduct various materials through the air or may be used in conjunction with any number of different items including sprayguns but not limited to the same.

It will be seen that the aspirating device in itself merely consists of a tube with the structure as heretofore described through which the air is introduced into its center through jets, said tube having one intake and into which any material may be fed, one outtake from which said material will be discharged and a source of air. It need not be used only in combination with the other items disclosed herein.

(3) The cutting rotor assembly as shown with its slicing action: This special cutter rotor assembly reveals a means for providing a slicing rather than a breaking type cut to fiber or other materials. By the slanting relationship of the blades across the face of the blade rotor, the various strands of material being fed into the rotor will be engaged by the blade at slightly different times and locations thus resulting in a true slicing. As also pointed out, the angular relationship helps hold the rotors in proper relationship one with the other and to avoid whipping or back-lashing of the material.

The housing and other major parts of the device, where not otherwise specified of a particular mute material may be made of any suitable material. I have found, however, because of the desire of light weight that with the exception of the discharge tube with the jet system that most of the parts are preferably made of a light weight metal, such as magnesium. This makes it very easy to transport and carry in conjunction with or mounted in connection with a spraygun or other apparatus.

The discharge tube is preferably made of steel although again a wide variety of materials may be used and the only limiting factor is the question of ultimate life desired. The wear on all of these parts is relatively light and therefore most materials may be used. The reference to light weight metals herein is not to be considered a limitation but a suggestion for optimum effectiveness.

FIGURES 15, 16 and 17 show the cutter air valve and aspirator tube combined with a spray gun as mentioned above. The spray gun has a frame 150 with a handle 151 for operator's convenience in holding the device. There are two separate spray nozzles 152 and 153 supplied with liquid by tubes 154—155 and the sprays from both nozzles are controlled by the operator through trigger means 156. The chopped fiber from the cutter comes out through the third barrel 157. Controls for the cutter and its air supply have been described above. The air supply for the liquid nozzles enters by tube 158.

While the embodiment of this invention disclosed and described herein is fully capable of achieving the objects and advantages desired it is obvious that many modifications may be made by those skilled in the art without departing from the inventive concepts disclosed herein. It is not my desire to be limited by these specific structures disclosed.

This application is a continuation-in-part of my pending application Serial No. 817,097, filed June 1, 1959.

I claim:

1. A device for cutting continuous fiber roving into short strands of fiber and for forcibly discharging the same comprising:
   (1) a housing having a roving inlet and a cut fiber outlet;
   (2) a fiber cutter within said housing located between said roving inlet and said cut fiber outlet;
   (3) air powered driving means for operating said fiber cutter;
   (4) means located between said fiber cutter and said cut fiber outlet for aspirating the cut fibers from said fiber cutter and propelling them through said cut fiber outlet;
   (5) a source of compressed air; and
   (6) an air valve comprising:
      (a) a body having an inlet connected to said source of compressed air, a first outlet connected to said aspirating and propelling means and a second outlet connected to said driving means, and
      (b) valve means in said body movable sequentially from full closed position wherein said inlet is closed to an intermediate position wherein only said first outlet is open and then to full opened position wherein both outlets are open, and reversibly movable sequentially from fully opened position to said intermediate position and then to fully closed position.

2. A device in accordance with claim 1, and further including a spray gun having a nozzle located adjacent said cut fiber outlet and positioned to emit liquid binder material into the stream of cut fibers propelled from said cut fiber outlet to thereby impregnate the cut fibers with the liquid binder material prior to deposition.

References Cited in the file of this patent

UNITED STATES PATENTS

| | | |
|---|---|---|
| 208,122 | Raymond et al. | Sept. 17, 1878 |
| 386,556 | Prall | July 24, 1888 |
| 436,299 | Boluss | Sept. 9, 1890 |
| 2,787,314 | Anderson | Apr. 2, 1957 |
| 3,025,195 | Kozma | Mar. 13, 1962 |
| 3,034,213 | Milligan | May 15, 1962 |